United States Patent
Demura et al.

[11] Patent Number: 6,035,322
[45] Date of Patent: Mar. 7, 2000

[54] IMAGE PROCESSING APPARATUS

[75] Inventors: Tatsuhiko Demura; Kazukuni Kitagaki; Goichi Otomo, all of Kanagawa-ken, Japan

[73] Assignee: Kabushiki Kaisha Toshiba, Kawasaki, Japan

[21] Appl. No.: 08/778,861

[22] Filed: Jan. 2, 1997

Related U.S. Application Data

[62] Division of application No. 08/379,562, filed as application No. PCT/JP94/01029, Jun. 27, 1994.

[30] Foreign Application Priority Data

Jun. 28, 1994 [JP] Japan ................................ 5-157149

[51] Int. Cl.[7] .................................................. G06F 17/00
[52] U.S. Cl. .................................................. 709/201
[58] Field of Search .................... 364/514 R, 715.02; 382/250, 232; 348/404, 407, 410; 395/200.18

[56] References Cited

U.S. PATENT DOCUMENTS

| | | | |
|---|---|---|---|
| 4,710,813 | 12/1987 | Wallis et al. | 385/136 |
| 5,036,493 | 7/1991 | Nielsen | 365/230.03 |
| 5,049,991 | 9/1991 | Nihara | 358/136 |
| 5,212,742 | 5/1993 | Normile et al. | 382/56 |
| 5,223,926 | 6/1993 | Stone et al. | 382/250 |
| 5,289,548 | 2/1994 | Wilson et al. | 382/250 |
| 5,301,032 | 4/1994 | Hong et al. | 382/250 |
| 5,367,629 | 11/1994 | Chu et al. | 382/250 |
| 5,379,351 | 1/1995 | Fandrianto et al. | 382/232 |
| 5,379,356 | 1/1995 | Purcell et al. | 382/250 |
| 5,469,273 | 11/1995 | Demura | 382/232 |
| 5,477,469 | 12/1995 | Motomura | 382/250 |

FOREIGN PATENT DOCUMENTS

| | | |
|---|---|---|
| 0 503 956 A2 | 9/1992 | European Pat. Off. . |
| 0 517 095 A1 | 12/1992 | European Pat. Off. . |
| 0 572 263 A2 | 12/1993 | European Pat. Off. . |

OTHER PUBLICATIONS

Duardo, et al., "DSC–HDTV Video Decoder System", IEEE Micro, vol. 12, No. 5, Oct. 1992, NY, USA, pp. 22–27.

Fandrianto et al., "A Programmable Solution for Standard Video Compression," Intellectual Leverage, Feb. 24–28, 1992, No. CONF. 37, Feb. 24, 1992, pp. 47–50.

*Primary Examiner*—Ellis B. Ramirez
*Attorney, Agent, or Firm*—Foley & Lardner

[57] ABSTRACT

An image processing apparatus which performs motion compensation prediction image decompression by a small circuit scale. The apparatus comprises: an image memory which is equivalent to a processing region and executes the motion compensation; and an adder. The adder executes interpolation calculation in the event that a reference image is constructed from a motion vector of ½ accuracy, and its result therefrom is stored in said image memory. Addition process of the reference image and difference data is processed by the same adder in a time sharing manner.

20 Claims, 12 Drawing Sheets

FIG.8

```
if ( macroblock_intra == 1 ) {
  if ( dct_dc_size != 0 ) {
    if ( dct_dc_differential & ( 1 << ( dct_dc_size - 1 ) ) != 0 ) {
      dct_dc = dct_dc_differential :
    }
    else {
      dct_dc = ( -1 << dct_dc_size ) | ( dct_dc_differential + 1 ) ;
    }
  }
  else {
    dct_dc = 0:
  }
  if ( macroblock_address - macroblock_address_past > 1 ) {
    dct_recon[0][0] = 1024 + ( dct_dc << 3 ) :
  }
  else {
    dct_recon[0][0] = dct_dc_past + ( dct_dc << 3 ) :
  }
  dct_dc_past = dct_dc :
  macroblock_address_past = macroblock_address :
}
else {
  *1_ward_r_size = *1_ward_f_code - 1 :
  *1_ward_f = 1 << *1_ward_r_size :
  max_*1 = 16 << *1_ward_r_size :
  min_*1 = -16 << *1_ward_r_size :
  if ( *1_ward_f == 1 || motion_*2_*1_ward_code == 0 ) {
    complement_*2_*1_ward_r = 0 :
  }
  else {
    complement_*2_*1_ward_r = *1_ward_f - 1 - motion_*2_*1_ward_r :
  }
  *2_little = motion_*2_*1_ward_code << *1_ward_r_size :
  if ( *2_little == 0 ) {
    *2_big = 0 :
  }
  else {
    if ( *2_little > 0 ) {
      *2_little = *2_little - complement_*2_*1_ward_r :
      *2_big = *2_little - ( *1_ward_f << 5 ) :
    }
    else {
      *2_little = *2_little + complement_*2_*1_ward_r :
      *2_big = *2_little + ( *1_ward_f << 5 ) :
    }
  }
  recon_*2_*1 = recon_*2_*1_prev + *2_little :
  if ( recon_*2_*1 > max_*1_ || recon_*2_*1_ < min_*1_ ) {
    recon_*2_*1 = recon_*2_*1_prev + *2_big :
  }
}
```

Variables of boldface : Value decoded from code

*1 : Will be "for" in the case of previous prediction, "back" in the case of future prediction

*2 : Will be "horizontal" in the case of horizontal direction ; "vertical" in the case of vertical direction

4-POINT INTERPOLATION

FIRST FIELD

SECOND FIELD

FIG.16

```
*1_ward_r_size = *1_ward_f_code - 1 ;
*1_ward_f = 1 << *1_ward_r_size ;
max_*1 = 16 << *1_ward_r_size ;
min_*1 = -16 << *1_ward_r_size ;
if ( *1_ward_f == 1 || motion_*2_*1_ward_code == 0 ) {
  complement_*2_*1_ward_r = 0 ;
else {
  complement_*2_*1_ward_r = *1_ward_f - 1 - motion_*2_*1_ward_r ;
}
*2_little = motion_*2_*1_ward_code << *1_ward_r_size ;
if ( *2_little == 0 ) {
  *2_big = 0 ;
}
else {
  if ( *2_little > 0 ) {
    *2_little = *2_little - complement_*2_*1_ward_r ;
    *2_big = *2_little - ( *1_ward_f << 5 ) ;
  }
  else {
    *2_little = *2_little + complement_*2_*1_ward_r ;
    *2_big = *2_little + ( *1_ward_f << 5 ) ;
  }
}
recon_*2_*1 = recon_*2_*1_prev + *2_little ;
if ( recon_*2_*1 > max_*1_ || recon_*2_*1_ < min_*1_ ) {
  recon_*2_*1 = recon_*2_*1_prev + *2_big ;
}
```

| | |
|---|---|
| Variables of boldface | : Value decoded from code |
| *1 | : Will be "for" in the case of previous prediction, "back" in the case of future prediction |
| *2 | : Will be "horizontal" in the case of horizontal direction ; "vertical" in the case of vertical direction |

FIG.17

```
if ( dct_dc_size != 0 ) {
  if ( dct_dc_differential & ( 1 << ( dct_dc_size - 1 ) ) != 0 ) {
    dct_dc = dct_dc_differential ;
  }
  else {
    dct_dc = ( -1 << dct_dc_size ) | ( dct_dc_differential + 1 ) ;
  }
}
else {
  dct_dc = 0;
}
if ( macroblock_address - macroblock_address_past > 1 ) {
  dct_recon[0][0] = 1024 + ( dct_dc << 3 ) ;
}
else {
  dct_recon[0][0] = dct_dc_past + ( dct_dc << 3 ) ;
}
dct_dc_past = dct_dc ;
macroblock_address_past = macroblock_address ;
```

Variables of boldface : Values decoded from code

FIG.18

| | |
|---|---|
| dct_dc_size | Bit size of DC component of DCT coefficient (decoded value) |
| dct_dc_differential | Difference value of DC component of DCT coefficient (decoded value) |
| dct_dc | DC component of DCT coefficient (calculated value) |
| macroblock_address | Address of present macroblock (decoded value) |
| macroblock_address_past | Address of past macroblock (copied value) |
| dct_coeff [0] [0] | (0,0) component of DCT coefficient (decoded value) |
| dct_dc_past | DC component of past DCT coefficient (copied value) |
| *1_ward_r_size | Quantization width of difference value of motion vector (calculated value) |
| *1_ward_f_code | Flag for quantization width of difference value of motion vector (decoded value) |
| *1_ward_f | Quantization width of difference value of motion vector (decoded value) |
| max_*1 | Maximum value of motion vector (calculated value) |
| min_*1 | Minimum value of motion vector (calculated value) |
| motion_*2_*1_ward_code | Basic vector value of motion vector difference (decoded value) |
| complement_*2_*1_ward_r | Remaining vector value of motion vector difference (calculated value) |
| motion_*2_*1_ward_r | Remaining vector value of motion vector difference (decoded value) |
| *2_little | Minimum value obtained from calculation of motion vector difference value (calculated value) |
| *2_big | Maximum value obtained from calculation of motion vector difference value (calculated value) |
| recon_*2_*1 | Motion vector (calculated value) |
| recon_*2_*1_prev | Motion vector in the past (copied value) |

*1 : Will be "for" in the case of previous prediction, "back" in the case of future prediction

*2 : Will be "horizontal" in the case of horizontal direction; "vertical" in the case of horizontal direction

IMAGE PROCESSING APPARATUS

This application is a division, of application Ser. No. 08/379,562, which is a national stage entry of PCTJP94/01029 filed Jun. 27, 1994.

TECHNICAL FIELD

The present invention relates to an image processing apparatus which utilizes motion compensation predicting encoding technique and which decodes code-compressed image.

BACKGROUND ART

Recently, development of information processing apparatus has been significant, so that novel apparatus such as a visual telephone and a system for television conference is being proposed. In a field of image transmission such a in the television conference and visual telephones, a basic technique therefor is a technique for compression and decompression of moving picture. Presently, international standardization work is being carried out at MPEG1 (Motion Picture Expert Group part 1) and MPEG2 (Motion Picture Expert Group part 2) of ISO (International Standard Organization). MPEG1 standard is a transmittal standard for non-interlace image whose bit rate is comparatively low, whereas MPEG2 is the transmittal standard for non-interlace or interlace image whose bit rate is comparatively high.

Though there are proposed various techniques for compressing and decompressing the image, one among those is a motion compensation predicting encoding technique. First, an inter-frame prediction encoding technique will be explained. The inter-frame prediction encoding is the encoding in which time correlation of the image is utilized, and difference between previous image and present image is transmitted in a sending side, and a transmitted difference value is added to the previous image stored in a receiving side so as to reconstruct the present image. A process therefor is shown in equation (1).

$$D(x,y,t)=D(x,y,t-1)+\Delta D(x,y,t) \quad (1)$$

In this method, a transmission bit width can be reduced for an image whose change or motion therefor is small, (in other words, the image in which correlation is high in terms of time direction). However, the bit width may be increased for the moving images. Thereby, a process of the motion compensation is added to the moving images, so that the bit width is reduced. In the motion compensation process, the moving quantity of the previous image and present image is evaluated in the sending side, and its quantity (motion vector) is transmitted together with the difference value. In the receiving side, the difference value is added to a value of position which is transited from the previous image by amount of the motion vector, so that a value for the present image is reconstructed. Its process is expressed in equation (2).

$$D(x,y,t)=D(x+mvx, y+mvy, t-1)+\Delta D(x,y,t) \quad (2)$$

Here, mvx and mvy indicate the motion vector in x and y directions, respectively.

There are several methods for taking the motion vector. When accuracy of the motion vector is pixel unit, there exists pixel's value D (x+mvx, y+mvy, t−1) for position that the motion vector points (see FIG. 9(a)). However, when the accuracy of the motion vector is ½ unit, there may be a case where there does not exist a pixel in a position that the motion vector points (see FIG. 9(b)). In that case, that point will be obtained by interpolating neighboring 2 or 4 points (see FIG. 9(b)). An interpolation process by four points is indicated in equation (3).

$$D(x,y,t)=\{D([x+mvx], [y+mvy], t-1)+D([x+mvx]+1, [y+mvy], t-1)+D([x+mvx], [y+mvy]+1, t-1)+D([x+mvx]+1, [y+mvy]+1, t-1)\}/4+\Delta D(x,y,t) \quad (3)$$

Here, [x] indicates a maximum integer which does not exceed rational number x.

As described above, in the image decompressing apparatus by the motion compensation prediction encoding, necessary are the interpolation process of reference image and addition with the difference value (hereinafter referred to as reconstruction process).

As a structure for the image to be transmitted, there are available a frame structure and a field structure. Referring to FIG. 10(a), a scanning line is transmitted for each line. In the field structure, an interlace scanning is performed as shown in FIG. 10(b), so that even-number line is transmitted in a first field while odd-number line is transmitted in a second field.

Moreover, as a method for calculating the motion vector, there are a frame prediction method and a field prediction method. In the frame prediction, a reference image is treated as the frame structure, and in the field prediction the reference image is treated as the field structure (when the reference image is of the frame structure, the image is treated as of the even-number line or the odd-number line alone).

In MPEG1 standard, only the frame structure is adopted. An example of a decompression circuit in the course of motion compensation prediction encoding in that case is shown in FIG. 11. In FIG. 11, an adder 2 is a block where the reference image is interpolation-processed, and an adder 3 is another block where the reconstruction process is performed. A reference image memory is a frame memory. FIG. 12 shows a timing chart. For difference data transmitted at any time, a reference image corresponding thereto is accessed at ay time, and is interpolation-processed at the same time with data readout, and then a reconstruction process is performed simultaneously after the interpolation process. As shown in FIG. 12, these processes are performed continuously, so that the interpolation process and the reconstruction process are carried out same time. As for the difference data, they are inverse-quantization-performed at computing element 6, and processes such as an inverse cosine transformation are carried out, so that delay corresponding thereto is caused. Thereby, it is necessary to adjust timing for accessing the reference image, in accordance with the outputs of these processes' results.

For images transmitted by signals according to MPEG2 standard, both frame and field types can be adopted for image structure for transmitted difference and for prediction methods. In an image compress/decompress apparatus which handles signals where both frame and field types can be adopted for the image structure and the prediction methods as in MPEG2, there must be provided a frame/field converting unit prior to the reconstruction process so that the image structure and the prediction method for the difference are matched. An example of a decompression circuit for the motion compensation prediction encoding in that case is shown in FIG. 13. In FIG. 13, an adder 2 is a block to perform the interpolation process of the reference image, and an adder 3 is another block to perform the reconstruction process. Moreover, frame/field conversion is carried out in an intermediate memory. The reference image memory is a frame memory. A process content where an entire frame is divided into small image planes (for example, 8×8 block) will be explained utilizing a timing chart shown in FIG. 14. The small image planes and peripheral pixel thereof are read out from the reference image memory, and interpolated in the adder 2 and their result is written to the intermediate memory 4. The difference data are inverse-quantization-performed in the computing element 6 and processes such as the inverse cosine transformation are carried out. These processes are performed simultaneously during period (1) of FIG. 14. After these processes are completed about the small image planes, the reference image is read out from the intermediate memory 4 in the same frame/field structure with the difference data, so as to carry out the reconstruction process. These processes are simultaneously performed during period (2) shown in FIG. 14.

Accordingly, in the image decompression apparatus having no intermediate memory therein, where the reference image is read in at the time of the difference data process, so as to perform the interpolation process and the reconstruction process, it is required to have an adder for use with interpolation and another adder for use with image reconstruction, so that amount of hardware has been quite a bit. Moreover, in the motion compensation prediction encoding image decompression apparatus having the intermediate memory therein, where the frame/field conversion process is carried out, not only the amount of hardware is large, but also there is no overlapping during operation time period of adders provided around the intermediate memory, so that one adder is not used while other adder is in use, thus being a very low-efficient system.

On the other hand, recently, there has been developed apparatus which compresses/decompresses digital codes by a digital signal process. In particular, in order to transmit/store the digital images having great amount of codes, worldwide standards such as MPEG, JPEG and H261 have been set, and there have been developed many compress/decompress units in accordance with these standards. In these standards, as a code compressing technique there are utilized motion compensation which utilizes a variable-length code and correlation in the direction of time axis, and a discrete cosine transformation. As a decoder, accompanied by the use of variable-length code, there is necessitated a code input buffer which temporarily stores an input code that is compressed in order to take synchronism of image and compressed code. Furthermore, accompanied by the use of the motion compensation, it is necessary to store a frame image in the past or in the future as an reference image memory. Moreover, since the input code is provided as a block unit to perform a second dimensional DCT, regardless of output being interlace/non-interlace, it is required to have an frame memory in order to output the decoded image in interlace or non-interlace mode.

Namely, three types of memory units are necessary which consist of a code input buffer for taking synchronism, a reference image frame memory for use with the motion compensation and a display image frame memory for use with conversion to frame/field. Since these memories are difficult to be integrated in a single LSI having the decode unit thereon due to a current limit in integrity degree in the event that a decode unit is to be constituted by a single LSI, they will have to be provided as an external memory which locates outside the LSI. However, if different memory is allocated to each different usage, the number of wirings, the scale of circuit and the amount of memory will become unduly large, so that in many case a memory serving as the external memory is used allocatedly and commonly as the buffers for above-mentioned reference image, display image and code input.

Usually, in the event that the motion pictures are compressed-encoding-series-decoded there occur five types of memory accesses: to write an input code in a code input buffer, to read out of the code input buffer, to read out the reference image due to the motion compensation, write into the reference image that reconstructs the reference image after decoding, and to read out the display image that displays the decoded image. The buffer can not overflow or disappear in the course of writing the ceaselessly data-flowing input code into the code input buffer and reading out the display image in order to constantly display the image, and reading and writing of the reference image is difficult to stop once started, due to overhead of the processing.

In order to process these memory access requests for the single external memory, two methods are conventionally adopted. One is a priority order method where, whenever the necessity of memory access occurs, the access request is sent to a bus arbitration unit, so that the bus arbitration unit performs the arbitration on the requested signals generated at each block according to predetermined priority order. Moreover, another method is a polling method where each request is processed in turn and without the priority order. In the former case, there is no problem when there are less memory accesses against the bandwidth of the memory, however, frequency of waiting state is increased when amount of the memory accesses is large so that the the memory access having low priority order is not likely to be processed. Thereby, overhead of the processing becomes large and the decoding of one-frame image can not be completed within one-frame display time, so that there is caused a problem where the input code does not synchronize with the output image. In the latter case, since a consecutive memory access can not be carried out, the overhead for page changeover becomes enlarged in a case utilizing DRAM for the external memory, so that the bandwidth may come short of.

On the other hand, there are two redundancies for the moving image:
(1) spatial-axis direction - - - resembles to a neighboring pixel, human eyes can not capture fine things very clearly;
(2) time-axis direction - - - consecutive images are very similar to each other.

In order to compress these redundancies of (1) and (2), there are taken the following techniques:
(1) As a certain size of block is taken as a unit, it is converted to a frequency component by performing a discrete cosine transformation (DCT), so that a high frequency component thereof is reduced by performing quantization;

Difference (DPCM) from the neighboring block is regarded as data; (2) As a certain size of block is taken as a unit, the motion vector and error component alone are regarded as data, by the motion compensation.

If this is applied to a general image, the motion compensation is difficult to be applied to a portion having relatively much redundancy in the spatial-axis direction (i.e. fast moving image), therefore, the DCT plus quantization and the DPCM are performed in order to compress the redundancy in the spatial-axis direction. In this case, the DPCM is carried out on a DC component having highest correlation with the neighboring block.

On the other hand, the motion compensation is performed on a portion having relatively much redundancy in the time-axis direction (i.e. image not so moving fast), and the motion vector and error component alone are regarded as data. In order to further compress the redundancy in the spatial-axis direction, the DCT plus quantization are carried out also on the error component in a unit of a certain block. However, since it is considered that the error component does not present a high spatial correlation to the neighboring block, the DPCM is not performed.

In brief:
(1) Motion busy image
  DC component of DCT coefficient - - - DPCM
  AC component of DCT coefficient - - - DCT+Quantization
(2) Less moving image
  Motion compensation+DCT+Quantization FIG. 15 is a conventional image processing unit that reconstructs the thus-coded data to the image. First of all, a decoding circuit 30 decodes a variable-length code, so as to obtain coefficients of flag and DCT and the like. Next, in a case of a block on which the motion compensation is performed, an inverse quantization (IQ) and inverse discrete cosine transform (IDCT) circuit 31 performs the IDCT on the DCT coefficient of the difference data so as to obtain the difference data, and simultaneously, a motion vector reconstructing circuit 32 reconstructs the motion vector by using such an algorithm shown in FIG. 16. Thereafter, utilizing the motion vector, a previous, future or both image data are taken from an image memory 34 by a motion compensation circuit 33, and are added to the difference data in an addition circuit 35 so as to form reconstructing pixel data.

In a case of a block where the pixel data themselves are DCT-performed without performing the motion compensation, the DC component alone of the DCT coefficient is DPCM-processed by a DPCM processing circuit 36 shown in FIG. 17. Then, the IDCT is performed in the IQ·IDCT circuit 31 along with other DCT coefficients, so as to form the reconstructing pixel data. The above-mentioned shows the conventional method for reconstructing the encoded image data to the image data. The meanings of commands shown in FIG. 16 and FIG. 17 are explained in FIG. 18.

As described above, in the conventional image decompression apparatus having no intermediate memory therein where the reference image is read in at the time of the difference data processing so as to perform the interpolation process and the reconstruction process, the scale for the circuit is unduly enlarged. Moreover, in the image decompression apparatus having intermediate memory therein where the motion compensation prediction encoding image decompression is performed accompanied by the frame/field conversion, there are caused problems where the circuit scale for the adder is unduly enlarged and there exists time duration during which the adder is not used.

Moreover, in the above-described conventional general bus arbitration function, there is caused a problem where a huge overhead is caused in the event of accessing to the external memory.

Moreover, as described above, the reconstruction of the motion vector and the DPCM process of the DC component in the DC coefficient necessitate to have a certain sequencer in order to judge conditions and perform each calculation using decoded flags shown in FIG. 16 and FIG. 17, thus resulting in a large scale of hardware. Moreover, since in the compression and decompression technique of the image data where various standards and application are possible, since there is possibility where interpretation of the flag and manner of the calculation may differ, it is desirable that above-described sequencer can be controlled by software so as to present more flexible applicability and extendability. However, in that case, an instruction memory therefor and so on will be necessary, so that the amount of hardware will be increased. In the conventional image processing apparatus two sequencers have been required, so that the amount of hardware tends to be unduly increased.

DISCLOSURE OF THE INVENTION

The present invention is made in view of this point, and it is an object of the present invention to provide an image processing device which executes motion compensation prediction encoding image decompression by a small circuit scale.

Another object of the present invention is to provide the image processing device which can perform effectively access to an external memory by providing separate internal buffers for each use with readout/write-in of the external memory.

Still another object of the present invention is to provide the image processing device where usage effectiveness for hardware is superior.

In order to solve the foregoing subjects, the image processing device according to the present invention, comprises: an image memory which is equivalent to a processing region and which performs motion compensation; and an adder, so that interpolation process and reconstruction process which do not overlap in terms of time are carried out by the same adder by utilizing time multiplicity.

Moreover, as one embodiment, there is provided an image processing apparatus comprising:
  decoding means for decoding an input code and restoring an image;
  input code write means for receiving a code series input externally and writing the code series to an external memory;
  input code readout means for reading out input series stored in the external memory, and transferring the code series to said decoding means;
  image reconstruction means for reading out a reference image stored in the external memory, and adding to the image restored in said decoding means so as to form a display image;
  image write means for writing the image formed in said image reconstruction means to the external memory;
  display image readout means for reading out the image written by said image write means from the external memory, in order to display the image in an external portion;
  connecting means for connecting said image reconstruction means, said input code write means, said input code readout means and said display image readout means to the external memory;
  data storing means for temporarily storing data which each said input code write means, said input code readout means and said display image readout means read out from the external memory; and
  memory bus arbitration means for determining to select which among said image reconstruction means, said image write means, said input code write means, said input code readout means and said display image readout means is to be connected to said connecting means;
  wherein said memory bus arbitration means divides five types of memory accesses including writing the input code into a code input buffer, readout from the code input buffer, readout accompanied by the motion compensation, writing into a reference image which reconstructs the reference image after decoding and display image readout for displaying the decoded image, into a first group including writing the input code into the code input buffer, the readout from the code input buffer and the display image readout for displaying the decoded image which present a higher access priority order and a second group including the readout accompanied by the motion compensation and the writing into the reference image which reconstructs the reference image after decoding which present lower priority order and are to be executed continuously, and wherein a right to access is given only in a predetermined period by a polling method in the first group, and the right to access is moved to the second group when all requests in the first group are completed; when the right to access is moved to the second group and if there is an access request within the second group, the memory access is executed to a memory in question; once the right to access is given thereto, the memory access within the second group is such that other access request is turned down until a series of memory access is completed.

Moreover, in other embodiment, in an image processing apparatus where only coefficient of a discrete cosine transformation for a portion in which motion compensation is not performed is DPCM-processed in part of the portion by utilizing the discrete cosine transformation and motion compensation so that image data are reconstructed from codes where the image data are compressed and encoded, there is provided a program-controllable sequencer which can execute both processes of DPCM process for the coefficient of discrete cosine transform and the reconstruction of motion vectors.

By employing the above-described configuration according to the present invention, a circuit scale of the adder in the image processing device which performs the motion compensation prediction encoding image decompression can be reduced to almost a half.

In the above-described embodiment, when each of buffers for use with write of the code input buffer, readout of the code input buffer and readout of the display image reaches to a predetermined amount, each memory access is requested to the memory bus arbitration device; the readout of the reference image and the write of the reference image are requested to the bus arbitration device when the process accompanied by internal decoding needs the readout of the reference image and the write of the reference image. In the memory bus arbitration device, the memory access request for the write of the code input buffer and the readout of the code input buffer is processed in a predetermined order. The write of the reference image and the readout of the reference image are processed when there are no more memory access for the write of the code input buffer, the readout of the code input buffer and the readout of the display image. By executing thus memory bus arbitration, the readout and write of the reference images can be carried out continuously, compared with a priority order method, so that processes to be executed after the readout and write of the reference image can be executed fast. Therefore, the overhead for the processing is reduced, so that an image having bigger size can be also handled. Moreover, compared to the priority order method, page switch caused by access to DRAM can be decreased without expanding the internal buffer. Thus, a bigger-sized image can be handled without utilizing a costly high-speed memory.

Moreover, the image processing device according to other embodiment is configured such that each type of flags after decoding is processed by a single software-controllable sequencer so as to send the DCT coefficient and motion vector and so on to IQ·IDCT circuit and motion compensation circuit and the like. Since there is provided a single sequencer, the DPCM process for the DC component of DCT coefficient and the reconstruction of motion vector are executed in a time sharing manner. However, as described in the BACKGROUND ART, when the DC component of the DCT coefficient is DPCM-encoded, it is a block to which no motion compensation is executed, so that there is no need to reconstruct the motion vector. On the other hand, in the block to which the motion compensation is executed, there is no need to perform the DPCM process since the DCT coefficient is not DPCM-performed. Therefore, although in the image processing device according to the present invention, the DPCM process for the DC component of the DCT coefficient as well as the reconstruction of the motion vector are carried out in the time sharing manner, there is not caused a processing time loss. Since there is provided a single sequencer, the hardware amount can be kept to its minimum.

BRIEF DESCRIPTION OF THE DRAWINGS

FIG. 8 is an example of program for the image processing device according to the third embodiment.

FIG. 16 is a figure to explain algorithm for reconstructing the motion vector.

FIG. 17 is a figure explaining DPCM process for the DC component of the DCT coefficient.

FIG. 18 explains meaning of each command shown in FIG. 8, FIG. 16 and FIG. 17.

BEST MODES FOR REALIZING THE INVENTION

Embodiments of the present invention will now be described with reference to the drawings.

First Embodiment

Figure 1:
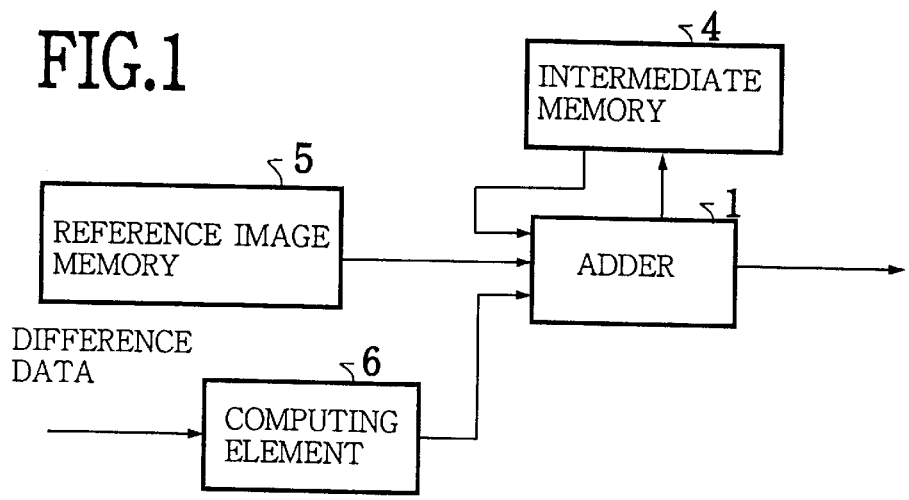
FIG. 1 is a configurational drawing of an image processing device according to the first embodiment.

An example for an image processing apparatus concerning the first embodiment is shown in FIG. 1. In FIG. 1, the reference numeral 1 denotes an adder which performs an interpolation process and reconstruction process. The reference numeral 4 indicates an intermediate memory which stores a small image plane (for example 8×8 block). The reference numeral 5 is a frame memory which stores a reference image equivalent to a single frame.

Figure 2:
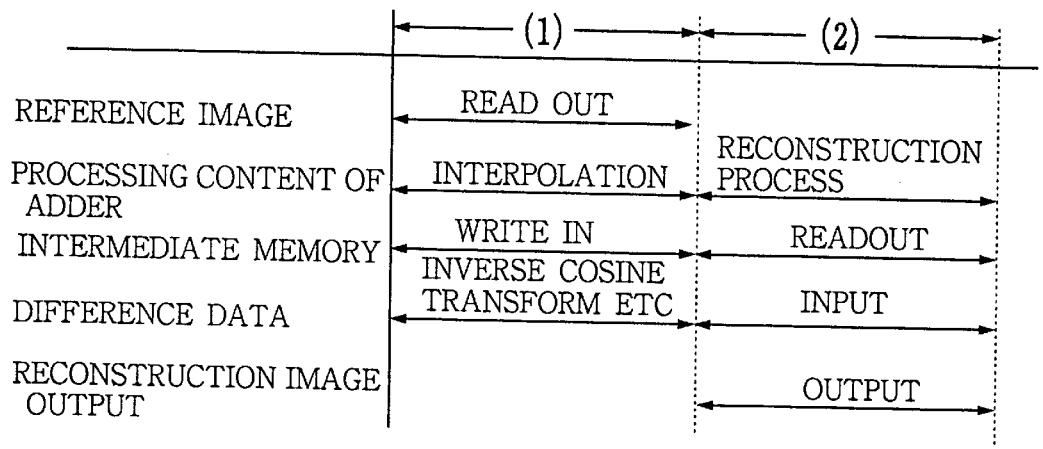
FIG. 2 is a timing chart showing a processing content for the image processing device according to the first modified example of the first embodiment.

A timing chart of the processing according to the first modified example is shown in FIG. 2. A processing content is explained in FIG. 2 by means of the timing chart when an entire frame is divided into the small image planes (for example 8×8 block). The small image plane and its peripheral pixel are read out from the reference image memory 5, and are interpolated by the adder 1. Its result obtained therefrom is written to the intermediate memory 4. The processing such as an inverse cosine transformation is carried out on the difference data by a computing element 6. These processings are simultaneously performed during period (1) shown n FIG. 2. After these processing are completed about the small image planes, the reference image is read out from the intermediate memory 4. Then, addition is performed thereto by the adder 1 that is used with the difference data outputted from an external portion and the interpolation process, so as to carry out the reconstruction process. These processings are simultaneously carried out during period (2) shown in FIG. 2.

According to the first modified example, the interpolation process of the reference image is performed during the processing such as the inverse cosine transformation of the difference data, and the same adder is used for the interpolation process and the reconstruction process. Therefore, the circuit scale of the adder can be reduced almost by half, so that an effective system eliminating the waste can be realized.

Figure 3:
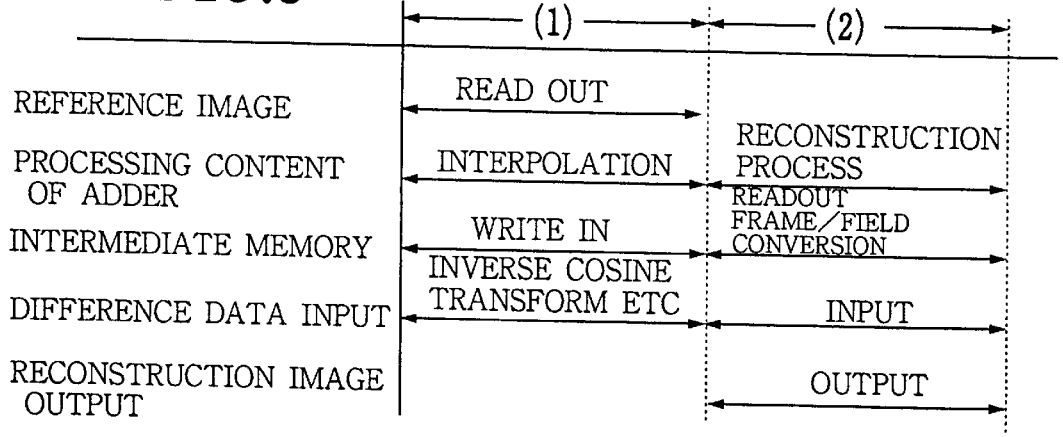
FIG. 3 a timing chart showing a processing content for the image processing device according to the second modified example of the first embodiment.
Figure 4A:
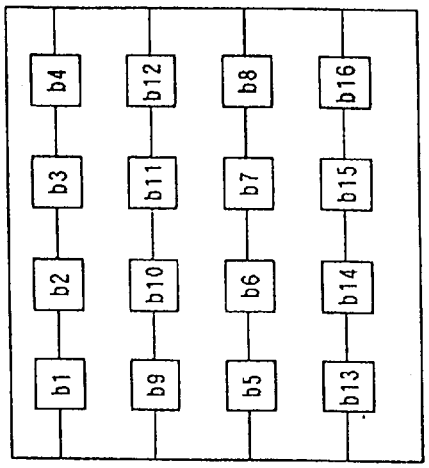
FIG. 4(a)–FIG. 4(d) are figures explaining image structure in the interpolation and reconstruction processes according to the first embodiment.
Figure 4B:
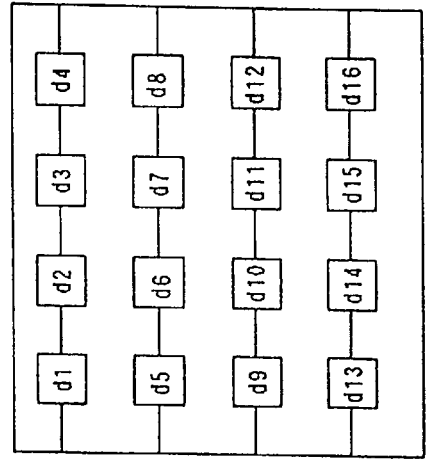
Figure 4C:
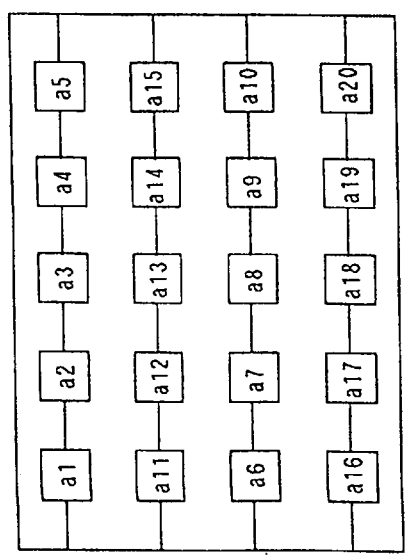
Figure 4D:
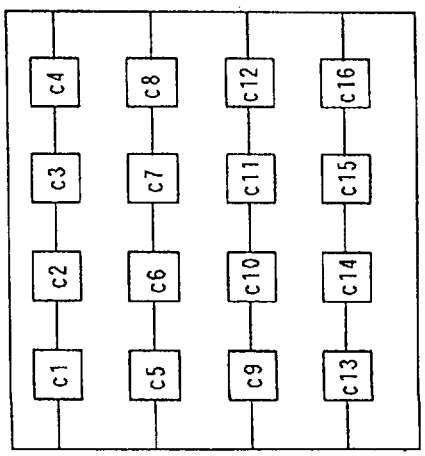

FIG. 3 is a timing chart for the processing according to the second modified example. According to the second modified example, the frame/field conversion is performed by utilizing the intermediate memory 4. In the same manner with FIG. 2, a processing content is explained by means of the timing chart shown in FIG. 3, when an entire frame is divided into the small image planes (for example 8×8 block). The small image plane and its peripheral pixel are read out from the reference image memory 5, and are interpolated by the adder 1. Its result obtained therefrom is written to the intermediate memory 4. The processing such as an inverse cosine transformation is carried out on the difference data by computing element 6. These processings are simultaneously performed during period (1) shown n FIG. 3. After these processing are completed about the small image planes, the reference image is read out from the intermediate memory 4 at the same frame/field structure with the difference data. Then, addition is performed thereto by the same adder 1 that is used with the difference data outputted from the external portion and the interpolation process, so as to carry out the reconstruction process. These processings are simultaneously carried out during period (2) shown in FIG. 3.

The detail of the processing about the second modified example will be explained with reference to FIG. 4 and FIG. 5. In this example, the processing is performed at 4×4 block. The motion compensation of entire 4×4 block is performed by a single motion vector, and the frame/field conversion is performed within the 4×4 block. The motion compensation is set to ½ accuracy in both row and column, and a four-point interpolation is carried out. FIG. 4($a$) indicates the structure of the reference image at the time of field prediction, where a1 through a20 correspond to pixels. The pixels connected by solid line indicate the first field, while the pixels connected by dotted line correspond to the second field.

Figure 5:
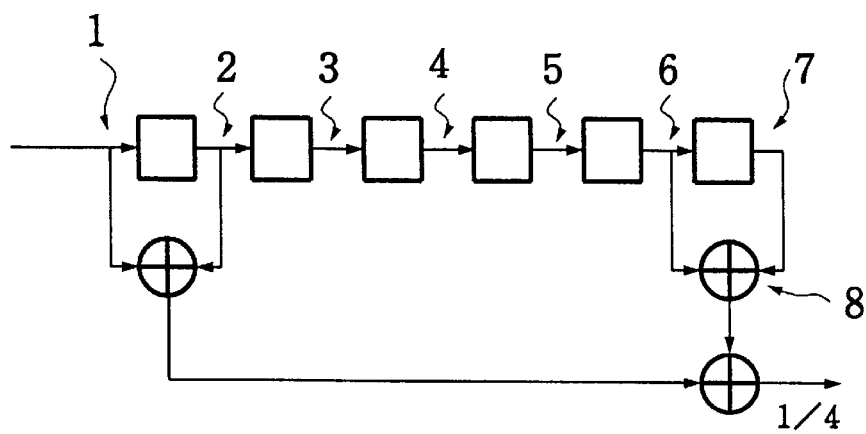
FIG. 5 shows an example of interpolation filter according to the first embodiment.

During the period (1) of FIG. 3, the pixels are read out in the order of a1, a2, a3, a4, a5, a6, a7, a8, . . . from the reference image memory, and are inputted to the interpolation filter shown in FIG. 5. In the interpolation filter, the average is taken from the present pixel 7 and and the pixel 6 adjacent to the right thereof, as well as from the pixel 1 situated one-line above and pixel 2 adjacent to the right thereof. The result of the interpolation is written to the intermediate memory. FIG. 4($b$) shows the structure of the data written to the intermediate memory. The above processing is expressed, as follows, by utilizing symbols shown in FIGS. 4($a$) and 4($b$), $$b1=(a1+a2+a6+a7)/4$$

The similar processing is performed up to b1 through b8 of the first field, thereafter, up to b9 through b16 of the second field.

During the period (2) of FIG. 3, the data written in the unit of the field are read out in the unit of frame. In other words, the pixels are read out in the order of b1, b2, b3, b4, b9, b10, b11, b12, b5, b6, . . . , and are added to c1, c2, c3, c4, c5, c6, c7, c8, c9, c10, . . . (FIG. 4($c$)) that are difference data transmitted by the frame structure, so as to obtain reconstructed images d1, d2, d3, d4, d5, d6, d7, d8, d9, d10, . . . (FIG. 4($d$)), where d1=b1+c1, d2= . . .

d5=b9+c5, d6= . . .

While the data are read out from the intermediate memory, the addition is not performed in the interpolation filter. Therefore, in the event of the addition in the reconstruction process, the adder of the interpolation filter shown in FIG. 5 can be utilized.

According to the second modified example, the interpolation processing for the reference image is performed during the processing such as the inverse cosine transformation of the difference data, and the same adder is used for both the interpolation process and the reconstruction process. Therefore, the circuit scale for the adder can be reduced. Besides, since the frame/field conversion is performed in the intermediate memory, there is no need for expanding memory, and the circuit scale can be reduced by almost half compared to the conventional practice in the case where the prediction technique is the bidirectional prediction in both previous and future directions.

Second Embodiment

Figure 6:
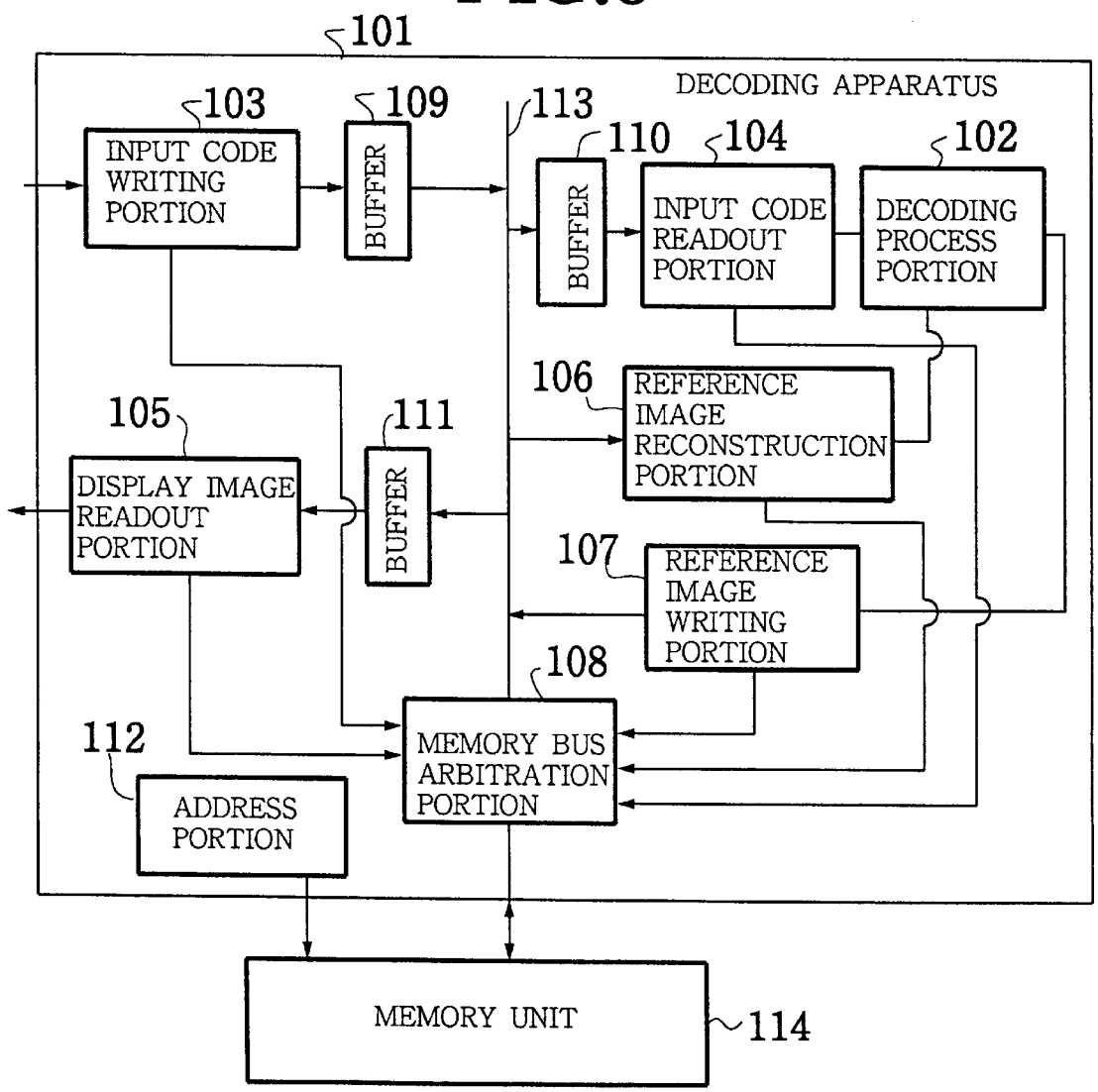
FIG. 6 is a block diagram showing the image processing device according to the second embodiment.

FIG. 6 is a block diagram showing configuration of the image processing apparatus according to the second embodiment.

Referring to FIG. 6, this decoding apparatus 101 comprises: a decoding process portion 102, an input code writing portion 103, an input code readout portion 104, a display image readout portion 105, a reference image reconstructing portion 106, a reference image writing portion 107, a memory bus arbitration portion 108, buffers 109 through 111, an address generating portion 112 and a memory bus 113. This decoding apparatus 101 is also connected to an external memory unit 114.

An input code coming from the external portion is input to input code writing portion 103 and is stored in buffer 109. When the code stored in buffer 109 exceeds a predetermined amount, a write request is sent to memory bus arbitration portion 108. Thereafter, when a signal to authorize memory access is sent back from memory bus arbitration portion 108, a predetermined amount of data in buffer 109 is written to memory unit 114 by memory bus 113 and address generating portion 112.

When the stored amount of buffer 110 becomes less than a predetermined level, code readout portion sends out a readout request to memory bus arbitration portion 108. Thereafter, when a signal to authorize memory access is sent back from memory bus arbitration portion 108, a predetermined amount of data is read to from memory unit 114 by memory bus 113 and address generating portion 112, so as to be stored to buffer 110. The code readout portion sequentially inputs the data stored in buffer 110 to decoding process portion 102.

When the image is decoded in decoding process portion 102, reference image reconstruction portion 106 sends out the readout request to memory bus arbitration portion 108. Thereafter, when a signal to authorize memory access is sent back from memory bus arbitration portion 108, all of necessary data is read to from memory unit 114 by memory bus 113 and address generating portion 112, so that the image reconstruction accompanied by the prediction is carried out by using the read-in data and the data decoded in decoding process portion.

When the image data are reconstructed in the reference image reconstruction portion, reference image writing portion 107 sends out a write-in request to memory bus arbitration portion 108. Thereafter, when a signal to authorize memory access is sent back from memory bus arbitration portion 108, the reconstructed image data are written to memory unit 114 by memory bus 113 and address generating portion 112.

Display image readout portion 105 reads out the data stored in buffer 111, and performs a necessary processing thereon so as to output externally. The amount of data stored in buffer 11 becomes less than a predetermined level, a readout request is sent to memory bus arbitration portion 108. Thereafter, when a signal to authorize memory access is sent back from memory bus arbitration portion 108, a predetermined amount of data is read to from memory unit 114 by memory bus 113 and address generating portion 112, so as to be stored to buffer 111.

In memory bus arbitration portion, the memory access request of display image readout portion 105, input code writing portion 103 or input code readout portion 104 is processed in a predetermined order. As for write-in and readout of the reference image, the signal to authorize memory access is generated when there is no more memory access for display image readout portion 105, input code writing portion 103 and input code readout portion 104.

By employing these above-described configurations, it does not occur that the data of buffers 109–111 in display image readout portion 105, input code writing portion 103, input code readout portion 104 are either empty or full so that the data flow becomes discontinuous and the processing is interrupted. Moreover, since the write-in and readout of the reference image can be performed continuously, the overhead due to the decoding process and memory access can be reduced.

Third Embodiment

Figure 7:
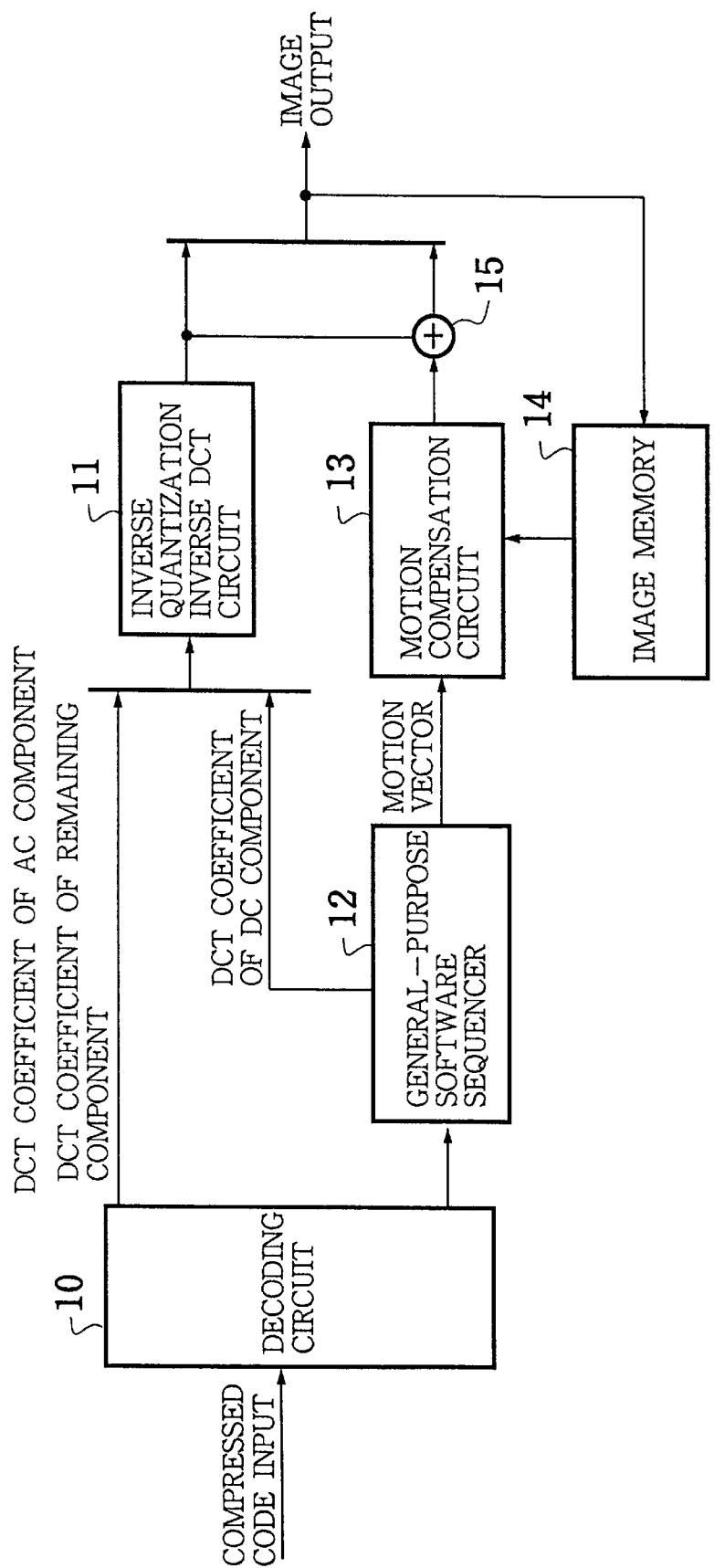
FIG. 7 is a configurational drawing of the image processing device according to the third embodiment.
Figure 9A:
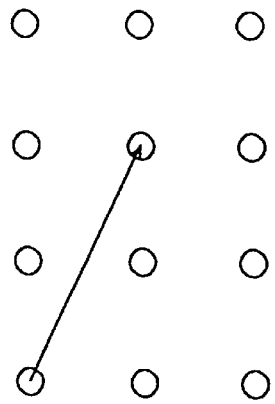
FIG. 9(a) and FIG. 9(b) are figures to explain the accuracy of motion vector according to the first embodiment.
Figure 9B:
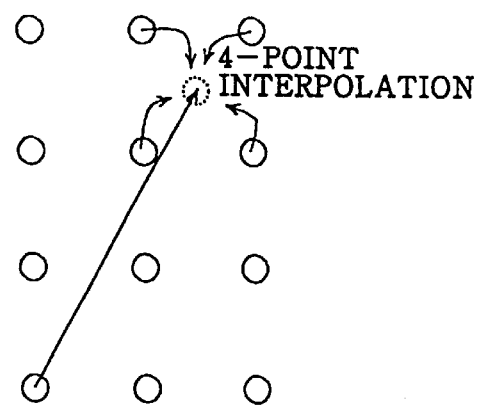
Figure 10A:
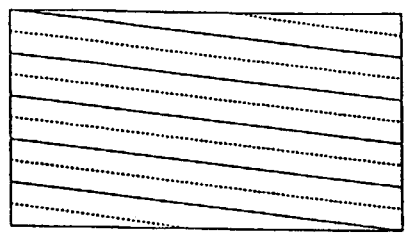
FIG. 10(a) and FIG. 10(b) are figures to explain frame structure and field structure of the image according to the first embodiment.
Figure 10B:
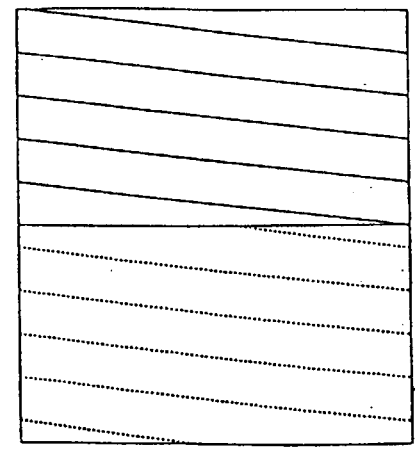
Figure 11:
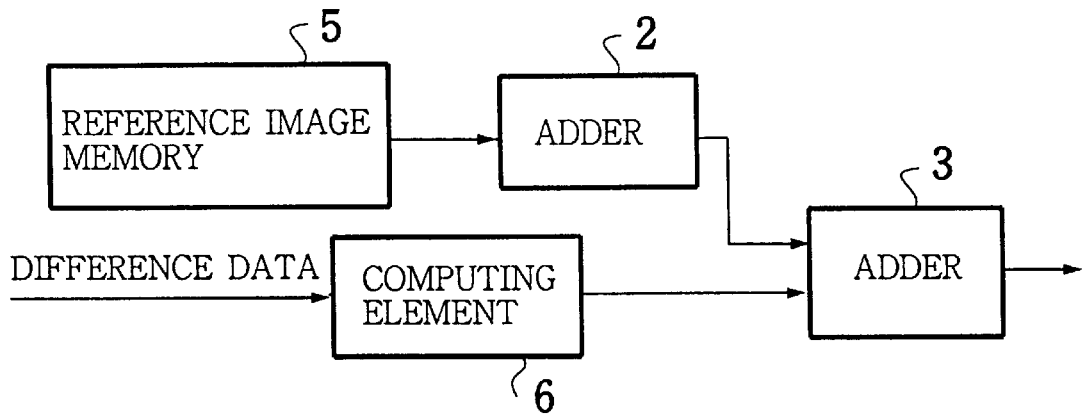
FIG. 11 is a configurational drawing showing the conventional image processing device where there is no frame/field conversion.
Figure 12:
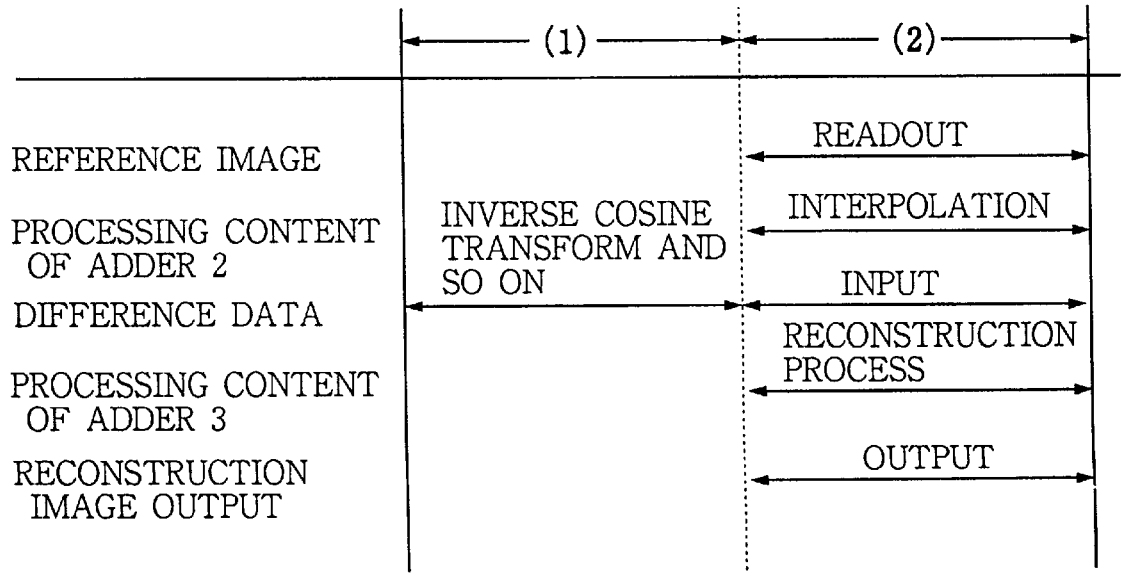
FIG. 12 is a timing chart showing the processing content of the conventional image processing device where there is no frame/field conversion.
Figure 13:
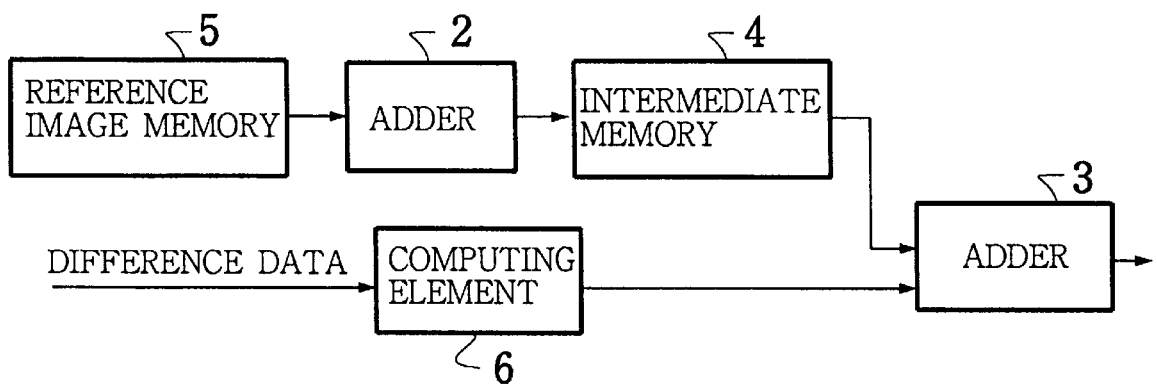
FIG. 13 is configurational drawing for the conventional image processing device having the frame/field conversion.
Figure 14:
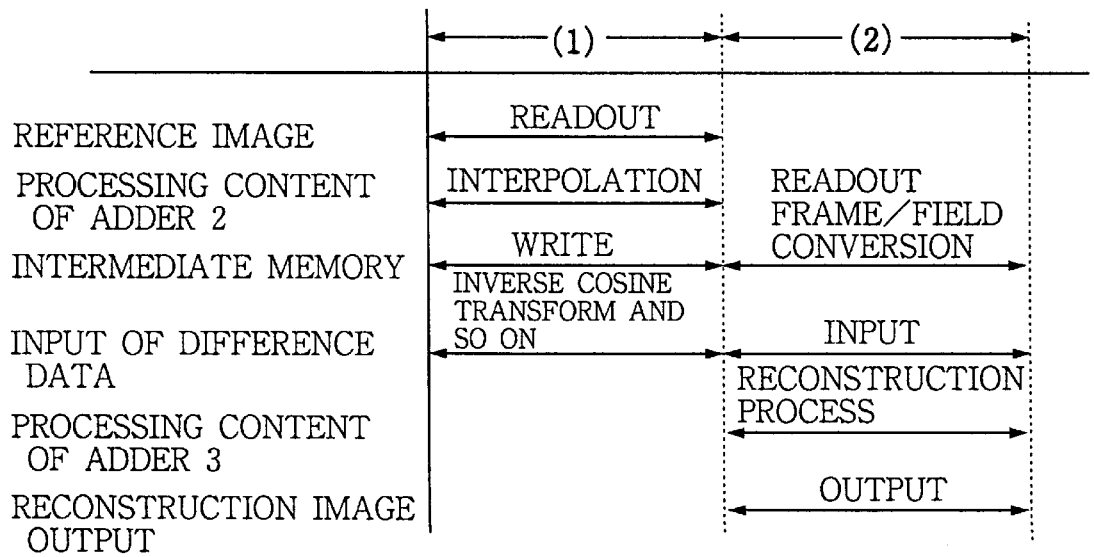
FIG. 14 is a timing chart showing the processing content of the conventional image processing device having the frame/field conversion.
Figure 15:
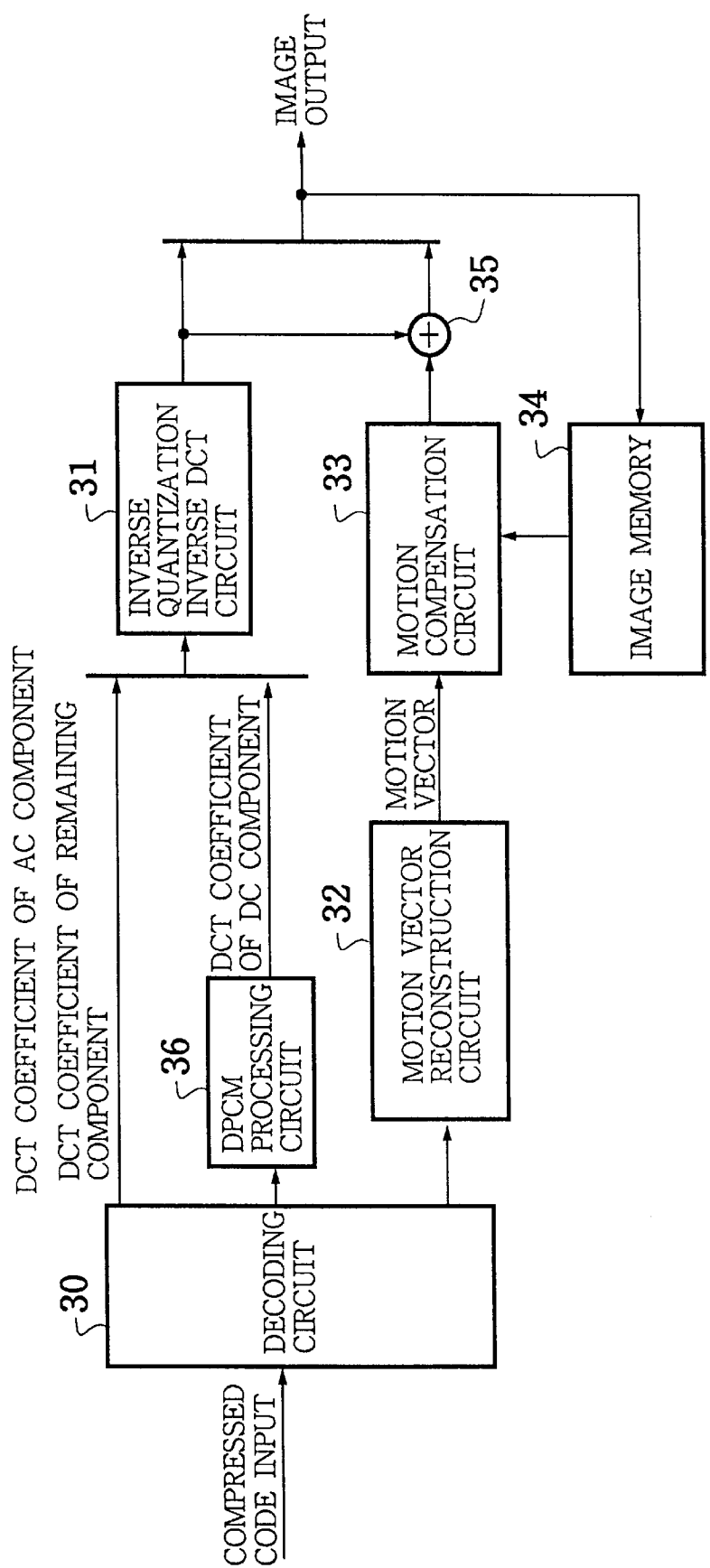
FIG. 15 is configurational drawing for the conventional image processing device.

FIG. 7 is the image processing apparatus according to the third embodiment. In this image processing apparatus shown in FIG. 7, each type of flag after having been decoded is processed by a single software-controllable sequencer so as to send the DCT coefficient and motion vector and the like to the IQ·IDCT circuit and the circuit for use with the motion compensation and the like.

First of all, a variable-length code is decoded by decoding circuit 10 so as to obtain a flag, DCT coefficient and so on. Next, in the block where the motion compensation is performed, the DCT coefficient of the difference data is IDCT-performed by the IQ·IDCT circuit 11 so as to obtain the difference data. Simultaneously, the motion vector is reconstructed by the program-controllable sequencer 12. Utilizing this motion vector, a previous or future image data or both these image data are extracted from image memory 14 in motion compensation circuit 13, and are added to the difference data by adder 15 so as to form the reconstruction pixel data. In the block where the pixel data themselves are DCT-performed without performing the motion compensation, only the DC component of the DCT coefficient is DPCM-processed by sequencer 12, and is IDCT-performed together with other DCT coefficients, by IQ·IDCT circuit 11, so as to form the reconstruction pixel data. The sequencer utilized in the image processing apparatus in this third embodiment can execute program shown in FIG. 8, and also execute reconstruction of the motion vector and DPCM process of the DCT coefficient in a time-sharing manner.

The above-described indicates operation of the image processing apparatus that reconstructs the coded image data into the image data, according to the third embodiment.

INDUSTRIAL APPLICABILITY

As thus far described in detail, according to the present invention, the circuit scale for the adder in the image processing apparatus that decompresses the motion compensation prediction coded images can be reduced by almost half, so that an effective system without creating idle time can be configured.

Moreover, in the above-described embodiments, internal buffers are provided separately for each separate use with external memory readout/write-in, and the read/write of the reference image is carried out continuously. Thereby, the overhead accompanied by the access to the external memory is not increased, so that the memory access can be executed effectively.

Moreover, in another above-described embodiments, since configuration is such that there is provided a single sequencer, hardware therefor can be suppressed to its minimum. Moreover, when various standards and applications are adopted, those can be handled with development for the software alone without increasing the hardware, thus providing the image processing apparatus having a highly efficient hardware.

What is claimed is:

1. An image processing apparatus comprising:
   input code write means for receiving a code series input externally and writing the code series to an external memory;
   input code readout means for reading out input series stored in the external memory;

decoding means for receiving the code series from the external memory, decoding the code series for restoring an image;

image reconstruction means for reading out a reference image stored in the external memory, and adding to the image restored in said decoding means so as to form a new image;

image write means for writing the image formed by said image reconstruction means to the external memory;

display image readout means for reading out the image written by said image write means from the external memory, in order to display the image in an external portion; and memory bus arbitration means for selectively allowing one of said image reconstruction means, said image write means, said input code write means, said input code readout means and said display image readout means to access to the external memory, wherein said image reconstruction means, said image write means, said input code write means, said input code readout means and said display image readout means are divided into first and second groups, the first group consisting of said input code write means, said input code readout means and said display image readout means, the second group consisting of said image reconstruction means and said image write means, wherein access requests from the first group are given a highest priority and treated by a polling method among them, wherein access requests from the second group are given lower priorities and treated by a priority order method among them.

2. The image processing apparatus as claimed in claim 1 wherein said image reconstruction means, said image write means, said input code write means, said input code readout means and said display image readout means are connected to a single bus through private buffers respectively.

3. The image processing apparatus as claimed in claim 2 wherein an access request from the second group is acknowledged when a predetermined amount of data is stored in each of the buffers.

4. The image processing apparatus as claimed in claim 1 wherein said image reconstruction means, said image write means, said input code write mean, said input code readout means and said display image readout means share a single memory device as the external memory.

5. The image processing apparatus as claimed in claim 1 wherein said coding means decodes the code series for restoring an image in accordance with motion compensation prediction coding image decompression.

6. The image processing apparatus as claimed in claim 1 wherein the polling method is resumed, after completing memory access initiated in response to a request of the second group, from a process next to a previous process which has been performed just before initiating the memory access.

7. An image processing apparatus for receiving and reconstructing image data in accordance with MPEG standard comprising:

decoding apparatus for receiving coded signals and reconstructing image data therefrom in accordance with motion compensation by temporarily storing data into buffers and taking out data from the buffers; and a memory device connected to said signal processing means for storing image data to be displayed and the coded signals as received and exchanging image data to be displayed and the coded signals with said signal processing means, wherein access requests of said signal processing means to said memory device are divided into first and second groups, said first group being related to processes requiring real-time handling as compared to said second group, wherein said decoding apparatus is provided with a memory bus arbitration means which arbitrates the access requests of said first group in a manner separate from the access requests of said second group.

8. The image processing apparatus as claimed in claim 7 wherein access requests from the first group are given a highest priority and treated by a polling method among them while access requests from the second group are given lower priorities and treated by a priority order method among them.

9. The image processing apparatus as claimed in claim 7 wherein an access request from the second group is acknowledged when a predetermined amounts of data is stored in each of the buffers.

10. The image processing apparatus as claimed in claim 7 wherein the polling method is resumed, after completing memory access initiated in response to a request of the second group, from a process next to a previous process which has been performed just before initiating the memory access.

11. The image processing apparatus as claimed in claim 7 wherein said decoding means decodes the code series for restoring an image in accordance with motion compensation prediction coding image decompression.

12. The image processing apparatus as claimed in claim 7 wherein said image reconstruction means, said image write means, said input code write means, said input code readout means and said display image readout means share a single memory device as the external memory.

13. The image processing apparatus as claimed in claim 7 wherein access is allowed only in a predetermined period by a polling method in the first group while access is allowed to the second group when all access requests in the first group are completed, and wherein, once access is allowed to the second group, the access is maintained until a series of memory access is completed.

14. The image processing apparatus as claimed in claim 7 wherein said decoding apparatus comprising:

input code write means for receiving a code series input externally and writing the code series to the memory device;

input code readout means for reading out input series stored in the memory device;

decoding means for receiving the code series from the memory device decoding the code series for restoring an image;

image reconstruction means for reading out a reference image stored in the memory device, and adding to the image restored in said decoding means so as to form a new image;

image write means for writing the image formed by said image reconstruction means to the memory device;

display image readout means for reading out the image written by said image write means from the memory device, in order to display the image in an external portion; and memory bus arbitration means for selectively allowing one of said image reconstruction means, said image write means, said input code write means, said input code readout means and said display image readout means to access to the memory device, wherein the first group consists of said input code write means, said input code readout means and said display image readout means, and the second group consists of said image reconstruction means and said image write means.

15. The image processing apparatus as claimed in claim 14 wherein access requests from the first group are given a highest priority and treated by a polling method among them.

16. The image processing apparatus as claimed in claim 15 wherein access requests from the second group are given lower priorities than that given to the first group and treated by a priority order method among them.

17. The image processing apparatus as claimed in claim 14 wherein said image reconstruction means, said image write means, said input code write means, said input code readout means and said display image readout means are connected to a single bus through private one of the buffers respectively.

18. The image processing apparatus as claimed in claim 14 wherein access is allowed only in a predetermined period by a polling around in the first group while access is allowed to the second group when all access requests in the first group are completed, and wherein, once access is allowed to the second group, the access is maintained until a series of memory access is completed.

19. An image processing apparatus comprising:

a decoding means for decoding an input code and restoring an image;

input code write means for receiving a code series input externally and writing the code series to an external memory;

input code readout means for reading out input series stored in the external memory, and transferring the code series to said decoding means;

image reconstruction means for reading out a reference image stored in the external memory, and adding to the image stored in said decoding means so as to form a display image;

image write means for writing the image formed in said image reconstruction means to the external memory;

display image readout means for reading out the image written by said image write means from the external memory, in order to display the image in an external portion;

connecting means for connecting said image reconstruction means, said input code write means, said input code readout means and said display image readout means to the external memory;

data storing means for temporarily storing data which each said input code write means, said input code readout means and said display image readout means read out from the external memory; and memory bus arbitration means for determining to select which among said image reconstruction means, said image write means, said input code write means, said input code readout means and said display image readout means is to be connected to said connecting means;

wherein said memory bus arbitration means divides five types of memory accesses including the input code write, input code readout, readout accompanied by the image reconstruction, image write and display image readout, into two groups where a first group includes the input code write, input code readout and display image readout which present high priority of access, and a second group includes the readout accompanied by image reconstruction and the image write which present lower priority than the first group and which are to be executed continuously, and wherein a right to access is given only in a predetermined period by a polling method in the first group, and the right to access is moved to the second group when all requests in the first group are completed; when the right to access is moved to the second group and if there is an access request within the second group the memory access is executed to a memory in question; once the right to access is given thereto, the memory access within the second group is such that other access request is turned down until a series of memory access is completed;

wherein said connecting means is a single bus shared by said image reconstruction means, said input code write means, said input code readout means and said display image readout means which are connected to the external memory through private buffers respectively.

20. The image processing apparatus as claimed in claim 19 wherein an access request from the second group is acknowledged when a predetermined amount of data is stored in each of the buffers.

* * * * *